(12) United States Patent
Bahr

(10) Patent No.: US 7,046,997 B2
(45) Date of Patent: May 16, 2006

(54) TRIAL UPGRADE CAPABILITY FOR WIRELESS HANDHELD DEVICES

(75) Inventor: Casey Bahr, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 10/329,215

(22) Filed: Dec. 23, 2002

(65) Prior Publication Data

US 2004/0203686 A1   Oct. 14, 2004

(51) Int. Cl.
*H04M 11/00* (2006.01)
*G06F 9/445* (2006.01)
*H04B 1/38* (2006.01)

(52) U.S. Cl. .................. 455/418; 717/169; 717/168; 717/173; 375/222

(58) Field of Classification Search ............ 375/222; 455/557, 561, 418, 425, 67.11, 419; 717/169, 717/173, 176; 340/825.22; 370/329, 338
See application file for complete search history.

(56) References Cited

U.S. PATENT DOCUMENTS

| | | | | |
|---|---|---|---|---|
| 5,726,639 A * | 3/1998 | Romero et al. | ......... | 340/825.22 |
| 5,887,254 A * | 3/1999 | Halonen | ...... | 455/419 |
| 5,974,312 A * | 10/1999 | Hayes et al. | ...... | 455/419 |
| 6,023,620 A * | 2/2000 | Hansson | ....... | 455/419 |
| 6,031,830 A * | 2/2000 | Cowan | ........ | 370/338 |
| 6,198,946 B1 * | 3/2001 | Shin et al. | ........ | 455/561 |
| 6,289,511 B1 * | 9/2001 | Hubinette | .......... | 717/173 |
| 6,308,061 B1 * | 10/2001 | Criss et al. | ........... | 455/418 |
| 6,483,820 B1 * | 11/2002 | Davidson et al. | ........... | 370/329 |
| 6,526,092 B1 * | 2/2003 | Nelson et al. | ........... | 375/222 |
| 6,708,045 B1 * | 3/2004 | Lieu et al. | ................ | 455/557 |
| 6,754,894 B1 * | 6/2004 | Costello et al. | ........... | 717/169 |
| 6,904,592 B1 * | 6/2005 | Johnson | ................ | 717/168 |
| 2002/0147677 A1 * | 10/2002 | Brady | ................ | 705/38 |

OTHER PUBLICATIONS

SYD ISSAQ, "Approaches to End-User Device Management," London Communications Symposium, Jul. 26-27, 1999, pp. 1-4.

* cited by examiner

*Primary Examiner*—William Trost
*Assistant Examiner*—Kiet Doan
(74) *Attorney, Agent, or Firm*—Kevin A. Reif

(57) ABSTRACT

A system permits trail capabilities of upgrade features for a wireless client, such as a personal digital assistant (PDA), without intervention of a remote service provider. The software for running a plurality of advanced features is preloaded, in a disabled state, onto the client prior to sale. The first time the user attempts to access the advanced feature a fault condition is triggered since this feature does not theretofore exist. The fault management system initiates a fault recovery routine in attempt to recover from the fault. This routine actually comprises the code that places the preloaded software in an enabled state thus beginning the trial period and allowing the user an opportunity to use and evaluate the advanced feature. Managed objects (MOs) associated with the feature monitors usage of the feature and such that the feature can be disabled when a threshold usage has been reached and the trial period is over.

25 Claims, 5 Drawing Sheets

TRIAL UPGRADE CAPABILITY FOR WIRELESS HANDHELD DEVICES

FIELD OF THE INVENTION

An embodiment of the present invention relates to wireless communication devices and, more particularly, to providing service upgrades to a user on a trial basis without intervention from the service provider.

BACKGROUND INFORMATION

Wireless devices, such as cellular telephones, and Personal Digital Assistant (PDA) communicators are gaining widespread acceptance. In order to be competitive in the marketplace and to meet consumer demand, service providers continue to offer an ever expanding array of services and features. Current generations of PDAs incorporate many features including cellular phone service.

PDAs are hand-held computers originally designed for use as personal organizers for storing notes, contact information, calendar dates and so forth. The current generation of PDAs additionally incorporate wireless and cellular technology and act as a phone for voice communications as well as allows users to access a variety of information and include services and features such as internet browsing, access to driving directions, instant stock quotes, entertainment locators, email service, and a variety of multi-media and video capabilities, to name a few.

First generation PDAs had the ability to synchronize or "sync" with the user's personal computer (e.g. desktop PC or laptop) for such things as downloading/uploading calendar information, personal phonebooks, text and other multimedia files. Such sync information is of course static in the sense that it is not automatically updated. More recently, wireless PDAs having Internet browser capabilities are more dynamic in nature and, in addition to syncing with the user's PC can also link to text-only web sites or web sites specifically developed for PDA browsers. A user typically subscribes to a service provider to provide these dynamic wireless services.

Traditionally, wireless devices such as cell phones or PDA communicators, more generally referred to as wireless clients, come pre-configured with built-in features that are already active and paid for. In the alternative, they can be enhanced later via purchases of specific software, requiring manual installation, a vendor site visit, or even a unit replacement. These methods may be disadvantageous for the customer as they must make up-front purchase decisions for features with which they may not have had adequate opportunity to evaluate or they must take responsibility for installation themselves. In the latter case the customer may not fully understand the vagaries of optimizing the capabilities and thus encounter technical problems. These traditional methods also cause difficulties for the vendors or service providers since they are challenged with the task of selling unevaluated features to the customer up front. Of course this is often a difficult sell.

Various schemes have been offered to efficiently manage wireless clients. For example, a paper by Syd Issaq, "Approaches to End-User Device Management", Mres Telecommunications, UCL, *London Communications Symposium*, Jul. 26–27, 1999, discusses various types of wireless clients (end-user devices) that have some stored program logic embedded within them. This paper also considers management interfaces that can be used to manage and control the devices remotely. As shown in FIG. 1, and discussed by Issaq, manager applications 100 send operation requests to an Agent application 102 within the managed devices. Within these devices, manageable resources are modeled by Managed Objects (MOs) 104, which represent a standardized definition of a particular type of network component, or resource. These MOs are said to encapsulate the underlying resources, and offer an abstract interface at their boundaries for management operations to be performed. These MOs may also emit notifications when some internal or external event affecting the object is detected.

However, the above mentioned management scheme involves remote management of embedded software loaded on the wireless clients by the service provider. A system for managing features of wireless clients that does not involve intervention of the remote service provider would be desirable.

DETAILED DESCRIPTION

Embodiments of the present invention provide a platform for allowing handheld wireless client users the ability to enable and use upgraded services and features of their device on a trial basis without intervention from, or direct requests to, the remote service provider(s). A built-in Operations, Administration, and Maintenance (OA&M) platform capability enables/disables trials and may perform appropriate adjustments to the user's billing or accounting profile should the user elect to keep the feature after the trial period. Operations, Administration, and Maintenance (OA&M) denotes broad functionality classes for a wireless handheld platform or client.

Operation may refer to the activities that provide services to the end user of a device and the associated functions required to support those services, such as provisioning (of resources and services), performance management, account management, and billing.

Administration may refer to the management of components that deliver required levels of service, and thus is associated with concepts such as Quality of Service (QoS), performance management, and traffic management where applicable.

Maintenance may be subdivided into corrective maintenance and preventive maintenance. Corrective maintenance involves failure detection and recovery. In contrast, preventive maintenance involves the tracking and alerting of pending or possible fault conditions and the re-configuration of platform resources in response thereto. Maintenance may apply to both hardware and software resources.

Figure 1:
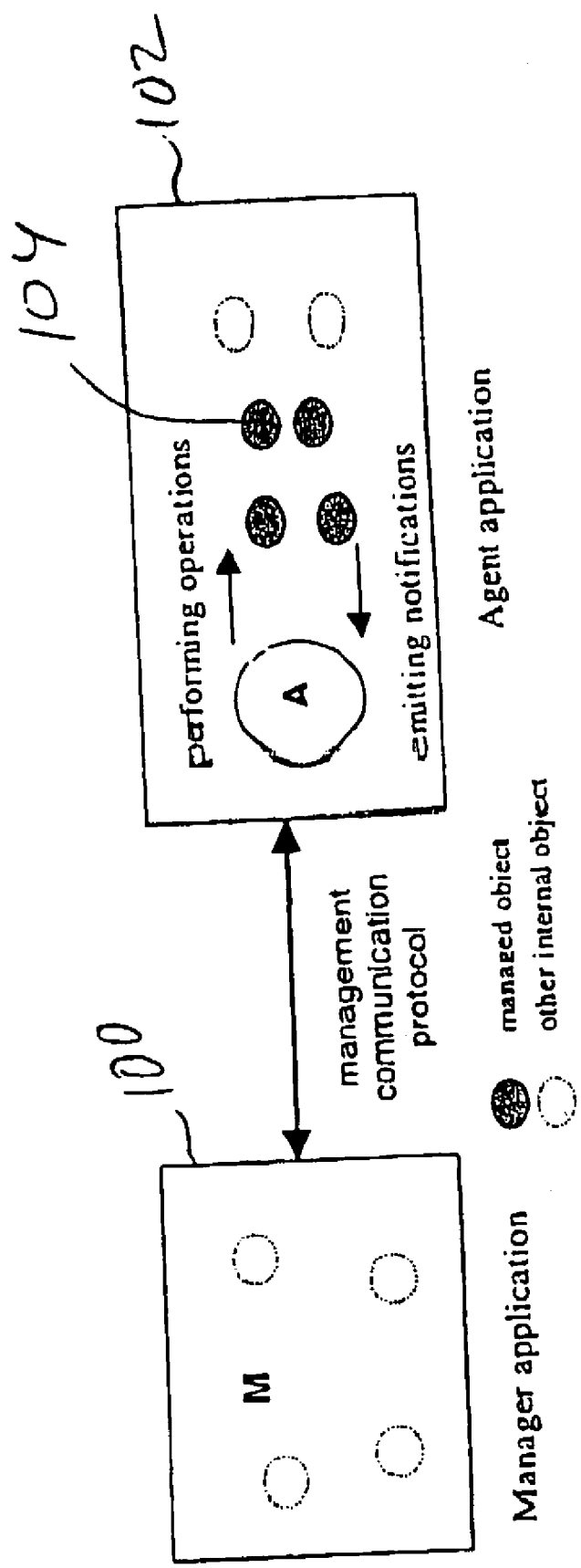
FIG. 1 is a conventional manager-agent model for allowing a remote service provider to wirelessly manage wireless clients.
Figure 2:
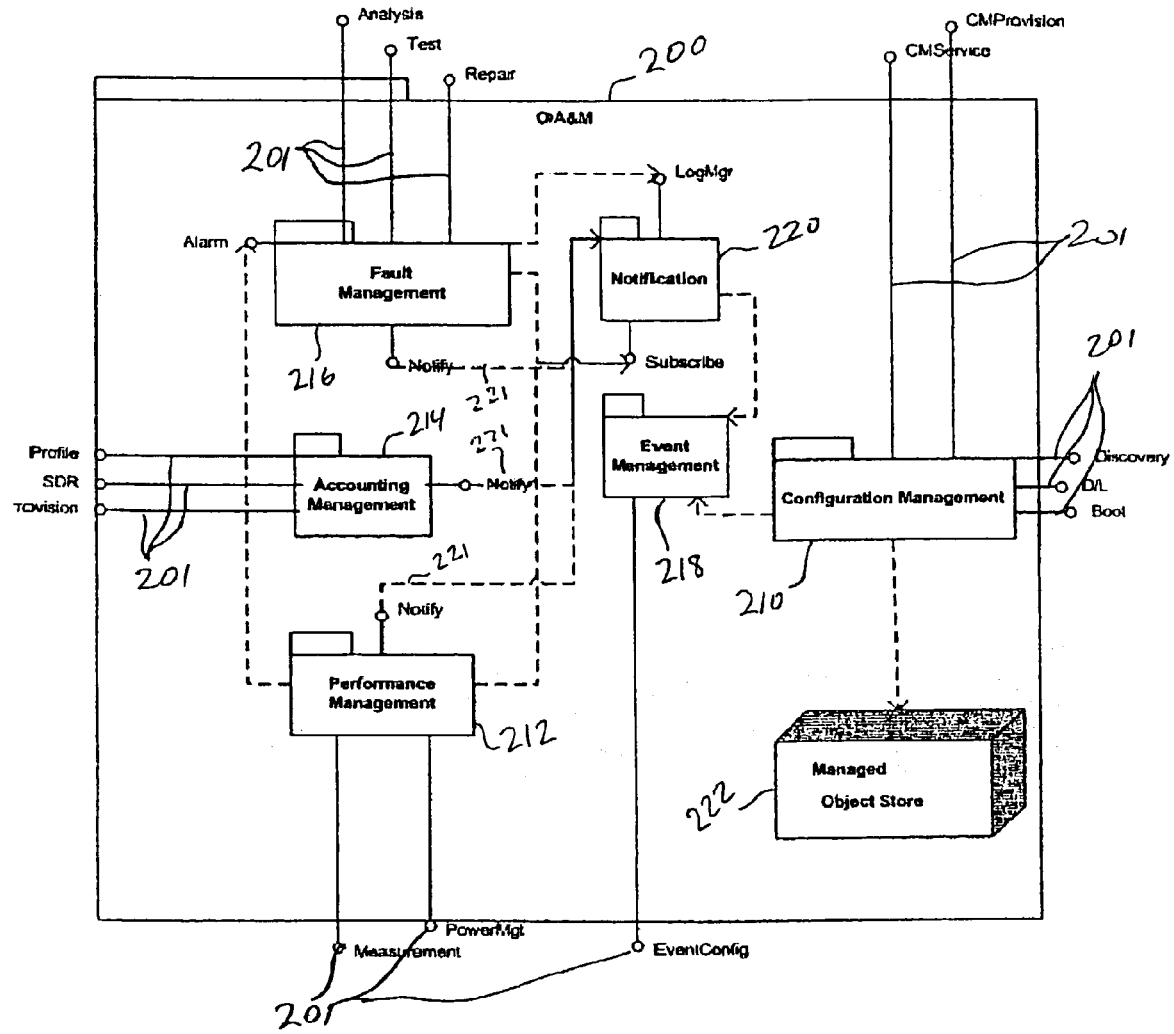
FIG. 2 is a high level diagram of a Operations, Administration, and Maintenance (OA&M) platform architecture.

Referring now to FIG. 2, there is shown a high-level architecture for the OA&M platform for wireless devices. The platform encompasses a layered system approach to the management of platform resources (e.g., devices, device or network components, peripherals, etc.) that can in some way be "managed", which is to say they are configurable as to various states and behaviors. The OA&M management functional areas are categorized as configuration 210, performance management 212, accounting management 214, and fault management 216. Also included are event management 218 and notification functions 220, which may be sub-sets of configuration management 218. FIG. 2 depicts overall view of the OA&M components and their relationships within and outside of OA&M.

Embodiments of the present invention are primarily concerned with the fault management 216 that is used herein as a vehicle for enabling/disabling upgraded services and features preloaded onto the wireless client. The other functional areas of the platform mentioned above and shown in FIG. 2 are briefly described below to afford the reader a context within which to better understand the environment that embodiments of the present invention operate.

The primary functional blocks are encompassed in the large block labeled OA&M 200. Any external interfaces ("lollipops") 201 are shown extending beyond the OA&M block 200. The functions of these external interfaces 201 are not particularly relevant to embodiments of the present invention and therefore discussion is omitted.

Configuration management functions 210 may be used by the OA&M 200 for defining and maintaining configuration data for the platform. Managed Objects (MOs) are stored in the MO store 222. This configuration data may be static or dynamic and is reflected in the MOs for the attributes or devices represented by the MOs. Configuration data is added to create new resources, deleted to remove unused resources, and modified to optimize existing resources. Configuration data also includes the software for system components that use this configuration data. This information may be utilized by asset/inventory management, network management, content or application delivery and provisioning applications, among others.

The Configuration Management function 210 handles the configuration of Managed Objects (MO), through the following five generalized operations, as examples:

1. Creation—create a maintenance object,
2. Initialization—initialize the maintenance object into a known operational state,
3. Deletion—remove the maintenance object,
4. Modification—modify the attributes of the maintenance object, and
5. Query—query the status or data of the maintenance object.

Event Management 218 provides a model for the capture and delivery of platform events. The domain of events encompasses any instantaneous occurrence of change in a platform managed object. According to an example embodiment, each Managed Object (MO) in the platform software model should preferably define, at minimum, one event used to monitor state or attribute change within that MO. Additional events can be defined by the MO for behaviors or characteristics specific to that MO. For instance, an MO may issue an event based on an internal timer or counter, which causes an event to be issued to an MO responsible for adjusting the performance or higher-level behavior of a platform resource that the MO represents.

The Notification block 220 packages and delivers event details to interested components in the system. These event details may be received from the other functional blocks via the lines labeled "notify" 221. Such information may include the MO generating the event, its class and instantiation, the time of the event, and optional information relevant to the particular MO, its function, and relationships to other MOs in the platform, if applicable. Other components within the platform may receive notifications via subscriptions.

The Performance Management (PM) block 212 may define functionality for end-user and business-level usage designed to achieve the highest levels of local and network performance, physical and logical configurations, preventative maintenance, avoidance of service outages, as well as measures of quality delivery from service providers and client application operation. PM 212 may be utilized by external entities, including on-platform management applications or remote monitoring or maintenance applications, such as Quality of Service (QoS) measurement and power management devices in order to enhance or optimize overall platform or subsystem performance-related characteristics.

As an example of PM 212 usage, a wireless handheld device with the ability to connect to multiple different networks for communication (e.g., cellular, 802.11x, Bluetooth, etc.) may have primary connectivity provided by one or more service providers. The ability to be able to monitor bandwidth, both preferred and actual, is fundamentally provided by PM functionality 212 to both client applications whose functionality is dependent on bandwidth levels as well as network accounting applications that are concerned with billing levels based on amount or type of data exchanged between client and network.

The Account Management block 214 interfaces with remote billing functions and device profiling functions and encompasses local platform data. This allows a Service Provider to reliably store and access local billing information and allow a subscriber to view the current state of their local account.

The Fault Management block 216 encompasses several areas of platform functionality. The Fault Management block 216 may detect alarms and faults as they occur and sends notifications to the other components, subsystems, or human operators immediately upon receipt. It further isolates faults to the smallest functional unit possible subsequently determining the limitation of the fault's effects. When feasible it also makes a determination as to the cause of the using test routines, diagnosis and correlation techniques. If the fault is one which is correctable, a maintenance and repair/recovery routine may be launched or human intervention called upon to correct the fault.

The above described OA&M platform may oversee and manage the operations, administration and maintenance of a wireless client/service provider system. Embodiments of the present invention are particular to the fault management block 216. More specifically, as the name would suggest, the fault management block 216 is primarily concerned with the management and repair of faults within the wireless client system. However, embodiments of the present invention further utilize the fault management block 216 to enable users to activate upgraded features preloaded onto their wireless client on a trial basis. That is, provide the user with the upgraded feature for a limited period to, for example, allow the user to evaluate the feature prior to purchasing the feature. One may not normally envision the fault management functions of a platform as the vehicle by which to provide upgraded services to a wireless client. As such, the user has an opportunity to use and evaluate the upgraded feature in real world situations and determine if this particular upgrade is a feature that they are willing to pay for and keep on a permanent basis. Further, there is no involvement of the service provided required to provide the client with the upgraded feature.

According to one embodiment of the invention, a wireless client is provided with the above described or similar OA&M platform. Prior to the user purchasing the wireless client, it is preloaded with software necessary to provide the wireless client with upgraded features or services. The list of upgraded services for which software may be preloaded is almost limitless. For example, it may be services and features as simple and common as caller-ID or call waiting functions, or a more sophisticated feature. An example of a more sophisticated upgrade feature may involve the ability of a wireless client to retrieve real-time stock quotes from the Web or other network service and populate desired quotes into a spread-sheet program running on the wireless client.

As noted above, currently wireless clients come pre-provisioned with built-in features that are already active and paid for, or else they are enhanced later via purchases of specific software, requiring manual install or a vendor site visit or even a unit replacement. Embodiments of the present invention provide a system for vendors to "pre-sell" limited usage versions of their advanced features to the customer and gives them the ability, via the OA&M platform to evaluate the usage and trials of the features as the client owner experiences them. To that end, actual full versions of the software allowing additional capabilities may be pre-installed on the wireless client. However, according to an example embodiment, this software may be installed in a disabled state and then enabled by the user at anytime they desire without intervention of the service provider.

Figure 3:
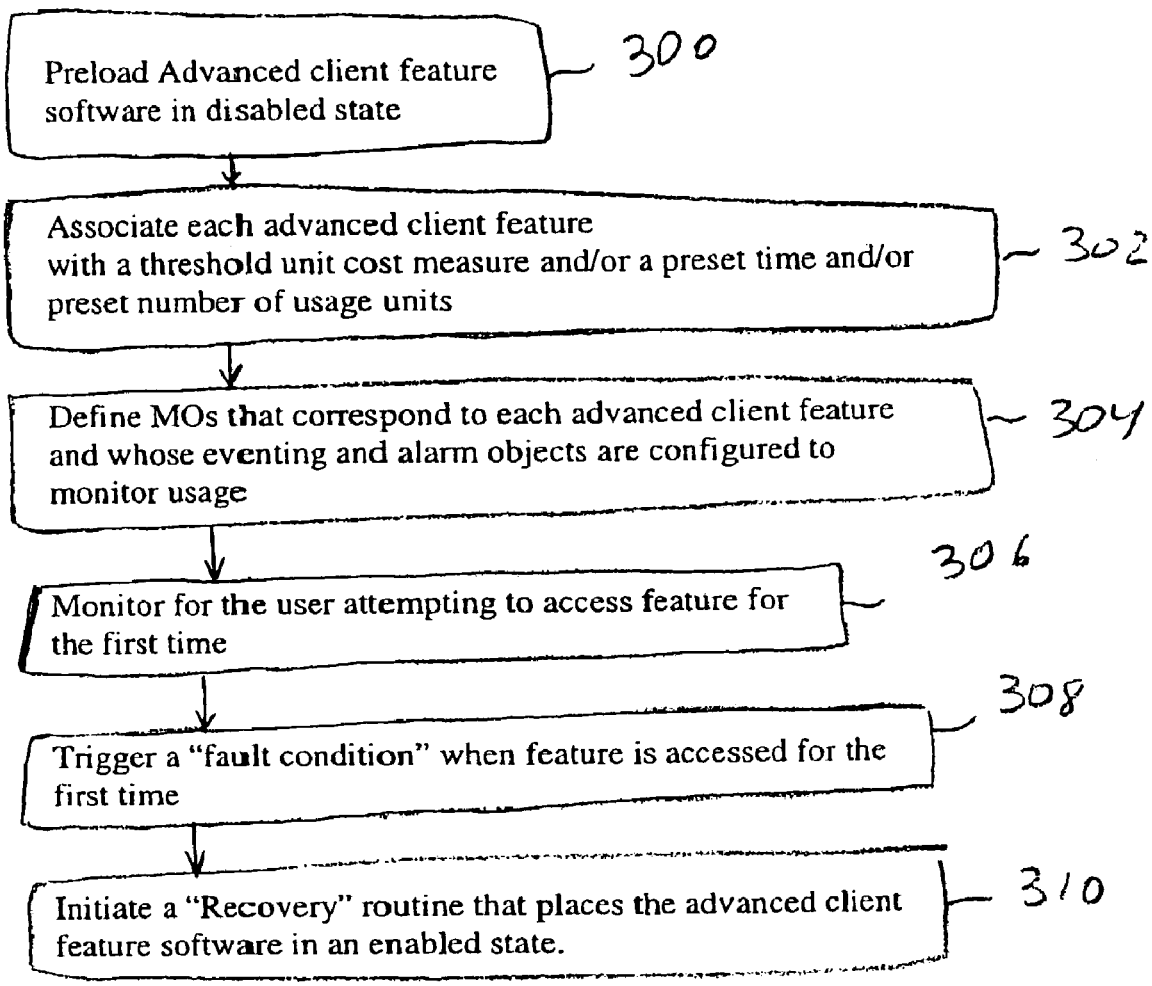
FIG. 3 is a flow diagram illustrating the procedure for enabling an advanced feature trial period.

FIG. 3 is a flow diagram illustrating a method for allowing trial capabilities for a wireless client according to an embodiment. In block 300, the wireless client may be preloaded with a plurality of advanced feature software. The software is loaded in a disabled state but can be enabled by the OA&M upon the user's request, such as by the first time the user attempts to access the feature. In block 302, each of the advanced features may be associated with a unit cost measure and/or preset number of units of usage, or time threshold (e.g. one week). This may define the "trial period" such that when the feature may be accessed a predetermined number of times or when a certain dollar amount usage or time usage of the feature has been reached the feature can be disabled thus ending the trial period. In block 304 a Managed Object (MO) within the Fault Management system of the OA&M is associated with each of the advanced features. The event and alarm objects of the MOs are configured to monitor the usage of the particular feature associated with the MO. In block 308, when the user requests the disabled feature for the first time, a fault condition is triggered, since the software for that feature is in a disabled state. The Fault Management triggers its ADAC (automatic detection automatic correction) fault recovery code. However, in this case, the fault recovery code is actually a routine to enable the requested feature. Thus, in a conventional system, if a non-enabled or non-subscribed to feature was requested by the user, a fault condition would be triggered and the recovery routine may for example simply inform the user that the feature did not exist. However, according to embodiments of the present invention, the fault recovery routine actually enables the requested feature to recover from the fault condition. In other words, when a user requestes a disabled feature a request (such as a fault condition) may be issued or triggered, and the appropriate code (e.g., fault recovery code) is then executed to load or enable the requested feature.

Figure 4:
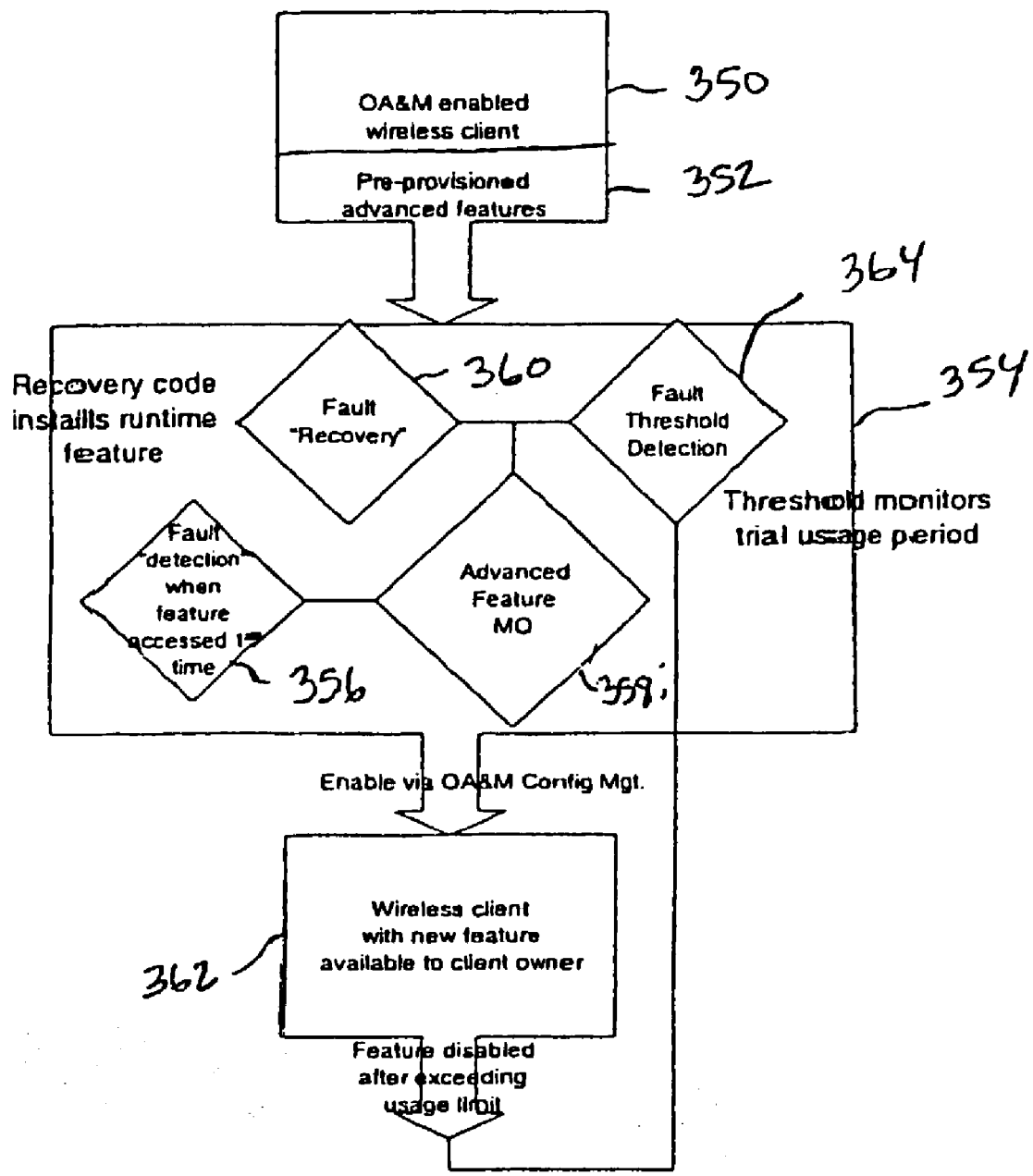
FIG. 4 is a flow diagram illustrating the transitions for enabling the advanced feature trial period utilizing OA&M fault management.

FIG. 4 illustrates the transitions that may occur within the fault management system of the OA&M that enables the advanced features on the wireless client according to an example embodiment. In block 350, a wireless client is enabled with an OA&M platform such as that described in FIG. 2. In block 352, prior to the user purchasing or taking possession of the client, the ***client is pre-provisioned with the software for running a number of advanced features. The advanced feature software is in a disabled state. Block 354 encompasses the events that may take place in the fault management system of the OA&M. In block 356 the fault management system of the OA&M detects a "fault" (or request) the first time the user accesses the feature. This condition of course triggers a fault since heretofore the requested feature is unavailable to the user since the software that implements the feature is disabled. In block 358, the MOs associated with that feature are used to relay the fault condition to a fault recovery module 360. The fault recovery module 360 contains a plurality of routines for recovering from various types of fault events. In this case, the "fault recovery" routine is actually the routine required to enable the particular advanced feature the user has attempted to use. In block 362 the wireless client enabled with the advanced feature is available to the client owner/user. After each usage, the fault threshold detection block 364 comprises a counter and/or comparator which detects the first usage of the advanced feature and each usage thereafter and advances a counter (cost meter or clock) to monitor the usage of that feature and compares it to the preset threshold defined by the MO for that feature. When the threshold has been reached, the trial period is over, another fault condition is triggered and this time the fault recovery block 360 runs a recovery routine to once again place the advanced feature software in a disabled state thus ending the trial period.

Figure 5:
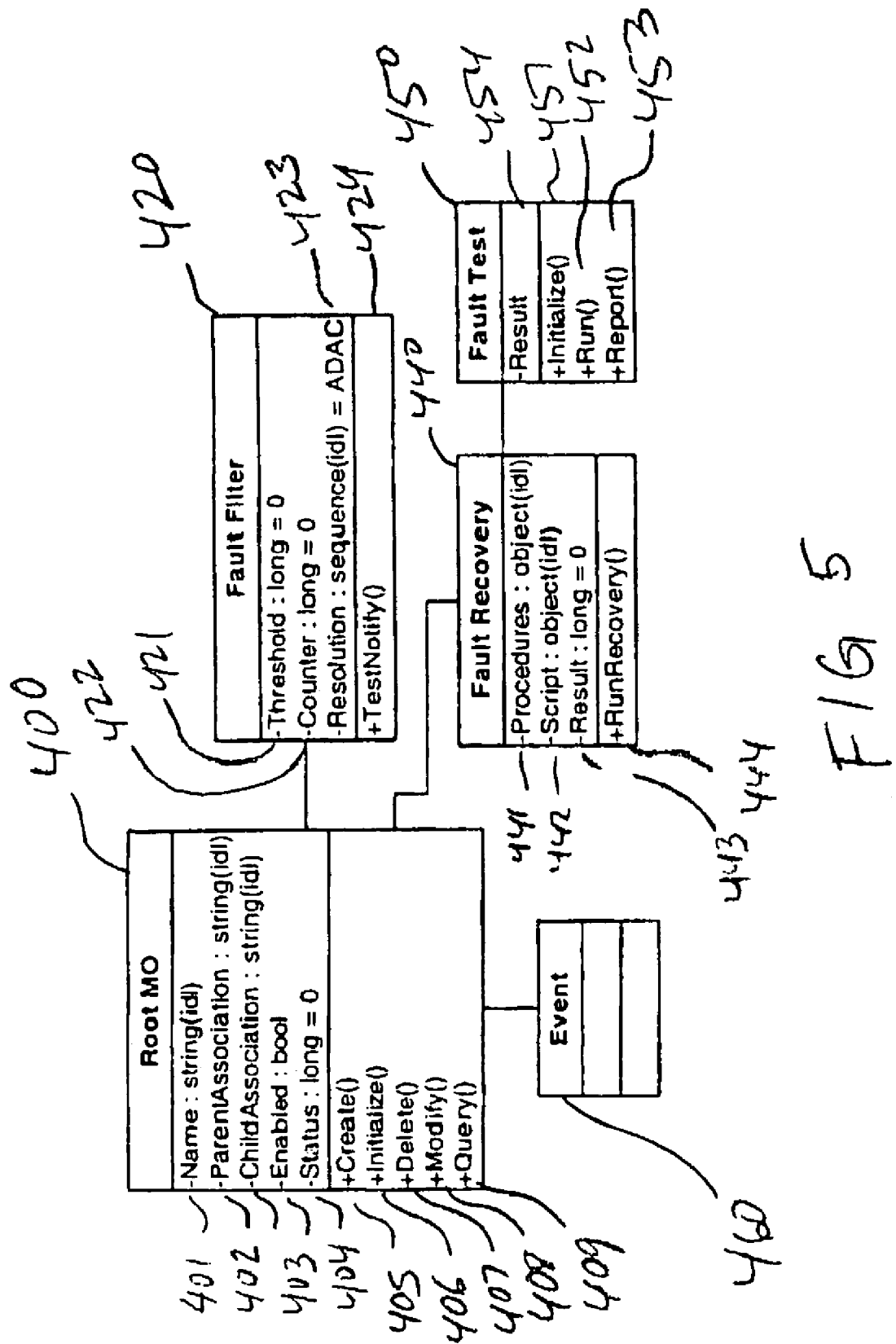
FIG. 5 is an example of a managed object (MO) according to one embodiment of the present invention.

FIG. 5 shows an example of a managed object (MO) that may be utilized by embodiments of the present invention. The MO comprises a Root MO 400 that comprises several objects including Name 401, Parent Association 402, Child Association 403, Enabled 404, and Status 404. Of course, these are by way of example only as in practice more or fewer objects may be encompassed by the MO having similar or other purposes. The Name object 401 is a unique identifier that identifies the particular upgraded feature managed by the MO. The Parent 402 and Child 403 Association objects may point to other MOs that could be associated with the same upgraded feature. Enabled 404 is a Boolean object that simply indicates whether the particular upgraded feature is presently enabled or not. The Status object 405 simply indicates the status of the upgraded feature (i.e., is the feature being used, is it functional, etc.). In addition, five methods are shown including Create 405, Initialize 406, Delete 407, Modify 408, and Query 409. These methods may be managed by the configuration management block 210 and are discussed above with reference to FIG. 2.

As shown, the Root MO 400 comprises several object subsets including Fault Filter 420, Fault Recovery 440, Fault Test 450, and Event 460. Each of these is discussed below.

The Fault Filter 420 sets the conditions for the triggering of a fault. For this particular embodiment, it represents the activation of the upgrade feature. Threshold 421 is the limit above which a fault event is triggered. Counter 422 represents the number of times this Fault Filter 420 was accessed each time the feature was activated. Resolution 423 specifies if this fault can be handled automatically (ADAC) or if it requires human intervention. TestNotify( ) 424 is a method used as callback to the filter whenever a test is run (from Fault Test 420).

In embodiments of the invention, the Fault Filter object 420 may be re-used three times:

1. Initially when the threshold 421 is set to 0. Upon first activation the count will be 1, triggering the "fault".

2. After Fault Recovery 440 occurs. Essentially when executing any installation or initialization of the feature, the counter 422 will be reset to 0 and the Threshold 421 will be set to whatever is the desired number of times to let the user activate the upgrade feature (e.g. 10 times). Note that if the period of activation is time or some other metric, the counter 422 and threshold 421 will have different meanings. For example, if the metric is time, the threshold 421 may be a maximum time limit (e.g. one week) and the counter 422 may be a clock that measures elapsed time from activation of the upgraded feature.

3. Finally, if the user elects to keep the feature beyond the trial period, a billing communication may occur with the provider of the feature. One exemplary way to permanently enable the upgraded feature may be to set the counter 422 to 0 and set the Threshold 421 to a very large number, such as the maximum representation of a 32-bit integer or the maximum value the threshold object can hold. In this case, since this threshold would never realistically be reached the upgraded feature would be for all practical purposes permanently enabled.

The Fault Recovery object 440 may be associated with the Root MO 400 and is the mechanism by which the "recovery" procedure is run. Procedure 441 comprises a set of instructions for how to proceed with the recovery. Script 442 comprises the actual recovery code to run. As previously discussed, this recovery code is actually the code that enables the upgraded feature activated by the user. Procedure 441 may be thought of as the calls into Script 442 that initiates the recovery process. The Procedure 441 object and the Script object 442 may be governed by the method RunRecovery( ) 444. The Result 443 object is for indicating whether the recovery was successful.

The Fault Test object 450 represents the minimal standard interface that should be supported by the Fault Recovery Script 442. The methods associated with Fault Test 450 may include Initialize 451 to initialize a fault test and Run 452 to run a fault test. The Report method 453 sets the result object 454 of a fault test operation.

The Event object 460 is included for completeness, but its details are not germane to the understanding of embodiments of the invention. The Event object 460 is merely included to show that the user activation of an upgraded feature is defined as an Event that will eventually trigger a fault.

Thus, as set forth above, embodiments of the present invention provide a system and method for allowing handheld wireless client users the ability to enable and use, on a trial basis, upgraded services and features of their device without intervention from, or direct requests to, the remote service provider(s). This comprises preloading a wireless client with software for operating at least one upgraded feature and placing the software in a disabled state. Triggering a fault condition a first time the upgraded feature is accessed and running a fault recover routine in response to the fault condition such that the fault recover routine places said software in an enabled state to start a trial period.

At least one embodiment of the invention may be implemented in software embodied with a medium for storing computer executable code to allow trial capabilities of an upgrade feature on a wireless client preloaded with upgrade feature software in a disabled state. The medium may be any medium suitable to be read by a computer or microprocessor including, but not limited to magnetic disks, optical disk, memory chips, or any suitable type of optical, magnetic or electronic memory.

Embodiments of the present invention are specifically illustrated and/or described herein. However, it will be appreciated that modifications and variations of the present invention are covered by the above teachings and within the purview of the appended claims without departing from the spirit and intended scope of the invention.

I claim:

1. A method for allowing trial capabilities of an upgrade feature for a wireless client, comprising: preloading a wireless client with software for operating at least one upgrade feature; placing said software in a disabled state; triggering a fault condition the first time at least one said upgrade feature is accessed; and running a fault recover routine in response to said fault condition, said fault recover routine placing said software in an enabled state to start a trial period, associating with each of said at least one upgraded features a managed object (MO); and populating a threshold object associated with said MO with a threshold value for the upgrade feature, incrementing a counter in accordance with a metric for determining a condition for ending the trial period; comparing a value of said counter to said threshold object; and disabling said software when said value of said counter reaches a value of said threshold object to end said trial period.

2. The method for allowing trial capabilities of an upgrade feature as recited in claim 1, wherein said metric is a unit cost measure.

3. The method for allowing trial capabilities of an upgrade feature as recited in claim 1 wherein said metric is number of uses.

4. The method for allowing trail capabilities of upgrade features as recited in claim 1, wherein said metric is time.

5. The method for allowing trial capabilities of an upgrade feature as recited in claim 1, further comprising:

setting said threshold object to a maximum value when said upgrade feature is permanently enabled.

6. A system for allowing trial capabilities of an upgrade feature in a portable device without intervention of a remote service, comprising: a software platform to manage operations of a portable device; a fault recovery module associated with said software platform to manage fault events; at least one upgrade feature software stored on the portable device in a disabled state, said upgrade feature software to cause said portable device to perform an upgrade feature; and a fault recovery routine associated with said fault recovery module to enable said upgrade feature software when a fault condition is detected to start a trial period a managed object (MO) associated with said upgrade feature; and a threshold object associated with said MO representing a threshold value associated with said upgrade feature.

a counter incremented in accordance with a metric for determining a condition for ending the trial period; and a comparator to compare a value of said counter to said threshold object and to disable said upgrade feature software when said value of said counter reaches a value of said threshold object to end said trial period.

7. The system for allowing trail capabilities of an upgrade feature in a portable device as recited in claim 6 wherein said fault condition is generated a first time a user attempts to use said upgrade feature and said upgrade feature software is in said disabled state.

8. The system for allowing trial capabilities of an upgrade feature in a portable device as recited in claim 6, wherein said metric is a unit cost measure.

9. The system for allowing trial capabilities of an upgrade feature in a portable device as recited in claim 6, wherein said metric is number of uses.

10. The system for allowing trial capabilities of an upgrade feature in a portable device as recited in claim 6, wherein said metric is time.

11. The system for allowing trial capabilities of an upgrade feature in a portable device as recited in claim 6, wherein said threshold object is set to a maximum value when said upgrade feature is permanently enabled.

12. A medium for storing computer executable code to allow trial capabilities of an upgrade feature on a wireless client preloaded with upgrade feature software in a disabled state, said code to execute instructions comprising: triggering a condition a first time said upgrade feature is accessed; and running a routine in response to said condition, said routine placing said upgrade feature software in an enabled state to start a trial period of the upgraded feature without intervention of a remote service provider.
associating with said upgraded feature a managed object (MO); and populating a threshold object within said MO with a threshold value for the upgrade feature.
incrementing a counter in accordance with a metric for determining a condition for ending the trial period; comparing a value of said counter to said threshold object; and disabling said upgrade feature software when said value of said counter reaches a value of said threshold object to end said trial period.

13. The medium for storing computer executable code as recited in claim 12, further comprising:
setting said threshold object to a maximum value when said upgrade feature is permanently enabled.

14. The medium for storing computer executable code as recited in claim 12, wherein said metric is one of unit cost measure, number of uses, and time.

15. A method for allowing trial capabilities of an upgrade feature for a wireless client, comprising: preloading a wireless client with software for operating at least one upgrade feature; placing said software in a disabled state; triggering a condition the first time at least one said upgrade feature is accessed; and running a routine in response to said condition, said routine placing said software in an enabled state to start a trial period without intervention of a remote service provider.
incrementing counter in accordance with a metric for determining a condition for ending the trial period; comparing a value of said counter to said threshold object; and disabling said software when said value of said counter reaches a value of said threshold object to end said trial period.

16. The method for allowing trial capabilities of an upgrade feature as recited in claim 15, wherein said metric is a unit cost measure.

17. The method for allowing trial capabilities of an upgrade feature as recited in claim 15 wherein said metric is number of uses.

18. The method for allowing trail capabilities of upgrade features as recited in claim 15, wherein said metric is time.

19. The method for allowing trial capabilities of an upgrade feature as recited in claim 15, further comprising:
setting said threshold object to a maximum value when said upgrade feature is permanently enabled.

20. A system for allowing trial capabilities of an upgrade feature in a portable device, comprising: a software platform to manage operations of a portable device; at least one upgrade feature software stored on the portable device in a disabled state, said upgrade feature software to cause said portable device to perform an upgrade feature; a software routine to enable said upgrade feature software when a condition is detected to start a trial period.
a managed object (MO) associated with said upgrade feature; and a threshold object associated with said MO representing a threshold value associated with said upgrade feature.
a counter incremented in accordance with a metric for determining a condition for ending the trial period; and a comparator to compare a value of said counter to said threshold object and to disable said upgrade feature software when said value of said counter reaches a value of said threshold object to end said trial period.

21. The system for allowing trail capabilities of an upgrade feature in a portable device as recited in claim 20 wherein said is generated a first time a user attempts to use said upgrade feature and said upgrade feature software is in said disabled state.

22. The system for allowing trial capabilities of an upgrade feature in a portable device as recited in claim 20, wherein said metric is a unit cost measure.

23. The system for allowing trial capabilities of an upgrade feature in a portable device as recited in claim 20, wherein said metric is number of uses.

24. The system for allowing trial capabilities of an upgrade feature in a portable device as recited in claim 20, wherein said metric is time.

25. The system for allowing trial capabilities of an upgrade feature in a portable device as recited in claim 20, wherein said threshold object is set to a maximum value when said upgrade feature is permanently enabled.

* * * * *

UNITED STATES PATENT AND TRADEMARK OFFICE
CERTIFICATE OF CORRECTION

PATENT NO. : 7,046,997 B2  
APPLICATION NO. : 10/329215  
DATED : May 16, 2006  
INVENTOR(S) : Bahr Page 1 of 1

It is certified that error appears in the above-identified patent and that said Letters Patent is hereby corrected as shown below:

In column 8, at line 36, delete "trail" and insert --trial--.

In column 8, at line 63, delete "trail" and insert --trial--.

In column 9, line 47, after "provider" insert --associating with each of said at least one upgraded features a managed object (MO); and populating a threshold object associated with said MO with a threshold value for the upgrade feature,--.

In column 10, at line 7, delete "trail" and insert --trial--.

In column 10, at line 31, delete "trail" and insert --trial--.

Signed and Sealed this

Fourth Day of September, 2007

JON W. DUDAS  
*Director of the United States Patent and Trademark Office*